United States Patent [19]

Schuiling

[11] Patent Number: 4,707,348

[45] Date of Patent: Nov. 17, 1987

[54] METHOD FOR NEUTRALIZING WASTE SULFURIC ACID BY ADDING A SILICATE

[75] Inventor: Roelof D. Schuiling, Bilthoven, Netherlands

[73] Assignee: Rijksuniversiteit Utrecht, Utrecht, Netherlands

[21] Appl. No.: 853,810

[22] PCT Filed: Jun. 27, 1985

[86] PCT No.: PCT/NL85/00026

§ 371 Date: Feb. 26, 1986

§ 102(e) Date: Feb. 26, 1986

[87] PCT Pub. No.: WO86/00288

PCT Pub. Date: Jan. 16, 1986

[30] Foreign Application Priority Data

Jun. 27, 1984 [NL] Netherlands ............... 8402035

[51] Int. Cl.$^4$ .................... C01F 11/46; C01B 33/12
[52] U.S. Cl. ................... 423/554; 423/166; 423/146; 423/338
[58] Field of Search ............ 423/166, 335, 339, 338, 423/554, 146

[56] References Cited

U.S. PATENT DOCUMENTS

| | | | |
|---|---|---|---|
| 1,205,659 | 11/1916 | Peacock | 423/166 |
| 2,375,749 | 5/1945 | Butt et al. | 423/554 |
| 2,402,370 | 6/1946 | Chalmers | 423/167 |
| 2,746,920 | 5/1956 | Wunderley | 423/166 |
| 2,754,175 | 7/1956 | Hendel | 423/554 |
| 2,785,950 | 3/1957 | Thomsen | 423/166 |
| 3,338,667 | 8/1967 | Pundsack | 423/339 |
| 4,070,260 | 6/1978 | Dreulle | 423/339 |
| 4,276,269 | 1/1981 | Lockerewte et al. | 423/101 |
| 4,289,736 | 9/1981 | Lalancette | 423/166 |
| 4,410,498 | 10/1983 | Hatch et al. | 423/146 |

FOREIGN PATENT DOCUMENTS

| | | | |
|---|---|---|---|
| 2390504 | 12/1978 | France . | |
| 54-4898 | 1/1979 | Japan | 423/339 |
| 325470 | 11/1957 | Switzerland . | |

*Primary Examiner*—Gary P. Straub
*Attorney, Agent, or Firm*—Young & Thompson

[57] ABSTRACT

It has been shown that magnesiumsilicates, particularly Mg-rich olivine, is very advantageous for neutralizing waste sulfuric acid. A silicagel and a Fe/Mg-containing liquid are formed. The experiments show that a distinct separation of the silicagel from the Fe-containing liquid is possible in case the neutralization process is performed in an inert atmosphere. After separation of the SiO$_2$-rich gel a Fe-V precipitate may be formed by means of aeration. The SiO$_2$ gel may be rinsed well, so that an acceptable product is formed that e.g. is useful in the concrete industry. The liquids formed are MgSO$_4$ rich. They may simply be drained into sea-water.

1 Claim, No Drawings

METHOD FOR NEUTRALIZING WASTE SULFURIC ACID BY ADDING A SILICATE

The invention relates to a method for neutralizing waste sulfuric acid by adding a salt of a weaker acid than sulfuric acid.

As appears from "Ullmann's Enzyklopädie der chemischen Technologie" 18, 579 (1982), it was common practice up to now to drain waste acid directly into the sea or into rivers. Said draining causes an unacceptable environmental effect on the surface waters. If from the waste sulfuric acid gypsum is formed by reacting it with calcium carbonate, the waste acid problem is only transformed, since in that case one obtains considerable quantities of gypsum for which an insufficient number of applications is available, particularly in view of the impurities present in that type of gypsum. (Consequently, according to the law, said gypsum is still considered a chemical waste).

It was found now, that the waste acid problem may be solved in an environmentally acceptable way by adding magnesium silicate to said waste sulfuric acid. Upon reaction with sulfuric acid two separate or easily separable phases are formed, the first of which consists of an aqueous solution of the sulphate ions and the magnesium metal ions derived from the salt and the second of which contains an $SiO_2$-containing precipitate, apart from the magnesium silicate that optionally is used in excess.

From a practical point of view magnesium silicate will be used, that reacts sufficiently quickly with sulfuric acid.

Magnesium silicates are e.g.: forsterite, olivine, enstatite and chrysolite.

Subsequently, the solution of sulfate ions and metal ions may be drained into surface water, or it can be used for an industrial application. This holds also for the precipitate obtained.

Magnesium is the second most important cation in sea-water and consequently there are no serious objections to the draining thereof. A similar argument holds for the sulfate ion, which is the second most important anion. Since further in case of using magnesium silicate a silica gel will be formed below the magnesium sulfate solution, and silica gel may be used for many purposes in the building arts, the use of magnesium silicate is very useful.

The reaction that occurs is illustrated by the following equation:

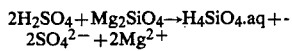

Said reaction occurs completely even at room temperature (18°–30° C.). The reaction rate depends on the surface area available and on the temperature. In a series of experiments it appears that at a temperature of 50° C. the reaction time is about 24 hours and at 85° C. it is just several hours. Literature data show that magnesium-rich olivine is the most advantageous of all magnesium silicates. It may be expected that if other magnesium silicates would be used, the reaction time would be at least ten times higher.

Olivine occurs in high concentrations in nature in stones that can be obtained easily. In a preferred embodiment of the method according to the invention particularly as regards using it on an commercial scale, olivine is added to the sulfuric acid. Indeed olivine contains apart from magnesium also small quantities of other metals, like nickel, but said metals may be extracted easily by means of known methods. Further iron is present in the solution. Said iron may be advantageous, since upon precipitation of iron hydroxide heavy metals may be precipitated simultaneously and subsequently they can be separated easily.

EXAMPLES

After having observed in a series of experiments that in order to achieve a fast reaction of the liquid olivine blend it has to be stirred continuously, and that a smaller grain size (higher specific surface) and a higher temperature increase the reaction rate, some experiments with waste sulfuric acid were carried out.

SERIES I 350 g. olivine, having the following a composition: $SiO_2$ 40.7 weight percent, MgO 50 weight percent, FeO 8.9 weight percent, NiO 0.4 weight percent, were added to 300 ml waste sulfuric acid (s.g. 1.29) having the following composition: $H_2SO_4$ 29 weight percent, Fe 1.8 weight percent, Mg 0.5 weight percent, Al 0.4 weight percent, Ti 0.5 weight percent, Cr 0.017 weight percent, V 0.050 weight percent. The amount of olivine is the quintuple of the amount required for a complete neutralization of the sulfuric acid. The grain size of the olivine varied from 0.15 to 0.5 mm.

At 25° C. after 45 hours a pH of 3.5 was reached. At 50° C. it took 7 hours and at 80° C. 1½ hour. After the reaction the mixture was not stirred for several hours. In all cases three layers were formed, the lower layer contained substantially only olivine. The middle layer was a thick layer of a brown gel and the upper layer was a thin layer of a clear, somewhat green coloured liquid. The analysis of the clear liquid showed that it contained 35 weight percent $MgSO_4$, while Fe and V could not be detected; the Cr percentage was 0.02 weight percent.

The gel contained 55 weight percent $H_2O$; 10 weight percent $SiO_2$; 5 weight percent $Fe_2O_3$; 30 weight percent $MgSO_4$; 0.07 weight percent V and 0.02 weight percent Cr. After repeated rinsing of the gel the major part of the $MgSO_4$ could be removed. Then, the gel contained about 75 weight percent $H_2O$; 12 weight percent $SiO_2$; 7 weight percent $Fe_2O_3$; 6 weight percent $MgSO_4$; 0.1 weight percent V and 0.12 weight percent Cr.

SERIES II

This series is identical to series I but the system was kept in a reducing condition by maintaining a nitrogen atmosphere above the liquid-olivine blend.

There was no difference in reaction time. After having stopped stirring the system divided itself again into three layers. The lower layer was formed by olivine. The second layer consisted of a transparent to white gel above which the clear green liquid was present.

The composition of the gel was 60 weight percent $H_2O$, 10 weight percent $SiO_2$, 5 weight percent $FeSO_4$ en 30 weight percent $MgSO_4$ with 0.03 weight percent V and 0.02 weight percent Cr.

After rinsing the composition of the gel was 85 weight percent $H_2O$, 12 weight percent $SiO_2$, 1 weight percent $FeSO_4$ and 1 weight percent $MgSO_4$.

After centrifuging the composition of the gel was 60 weight percent $H_2O$, 38 weight percent $SiO_2$, 1 weight percent $FeSO_4$ and 1 weight percent $MgSO_4$.

The green liquid was oxidized at pH 3.5 by means of $H_2O_2$.

Immediately a brown precipitate was formed having the composition: 70 weight percent FeOOH, 10 weight percent $MgSO_4$, 20 weight percent $H_2O$, 0.7 weight percent V and 0.03 weight percent Cr.

The remaining liquid contained 35 weight percent $MgSO_4$ and 0.02 weight percent Cr.

I claim:

1. In a method for reacting waste sulfuric acid with the magnesium silicate of olivine; the improvement comprising the steps of:

adding olivine to dilute aqueous waste sulfuric acid, in an amount at least several times in excess of that required fully to react with said acid;

effecting said reaction in an inert nitrogen atmosphere;

agitating the resultant reaction mixture;

allowing said reaction mixture to settle, thereby to obtain a three-phase system consisting of a bottom phase comprising excessive olivine, a middle phase comprising silica gel, and a top phase comprising an aqueous magnesium sulfate solution.

* * * * *